United States Patent [19]

Clardy

[11] Patent Number: 6,076,846
[45] Date of Patent: Jun. 20, 2000

[54] BICYCLE CHEST REST SYSTEM

[76] Inventor: Carl S. Clardy, 55 Eskew La., Cedar Creek, Tex. 78612

[21] Appl. No.: 09/130,436

[22] Filed: Aug. 6, 1998

[51] Int. Cl.[7] .................................................. B62K 19/40
[52] U.S. Cl. ............................. 280/290; 248/299.1
[58] Field of Search .............................. 280/288.4, 290, 280/304.1; 248/227.4, 230.5, 118, 299.1, 286.1, 297.21

[56] References Cited

U.S. PATENT DOCUMENTS

| | | | |
|---|---|---|---|
| 559,244 | 8/1896 | Williams | 280/288.4 |
| 575,787 | 1/1897 | Voitek | 280/304.1 |
| 578,027 | 3/1897 | Rogers | 280/288.4 |
| 588,881 | 8/1897 | Roberts | 280/288.4 |
| 2,937,839 | 5/1960 | Randolph | 248/299.1 |
| 4,978,167 | 12/1990 | Harvey | 297/195 |
| 5,326,122 | 7/1994 | Duffy | 280/288.4 |
| 5,383,677 | 1/1995 | Thomas et al. | 280/288.4 |

*Primary Examiner*—Brian Johnson
*Assistant Examiner*—Avraham H. Lerner

[57] ABSTRACT

A bicycle chest rest system comprising a pair of tubes. Each tube has a front and a rear end positionable in the direction of bicycle movement. The front of ends of the tubes are at an elevation above the rear ends. The tubes are curved about a common radius of curvature with an axis of rotation thereabove, and with a central cross bar therebetween.

10 Claims, 3 Drawing Sheets

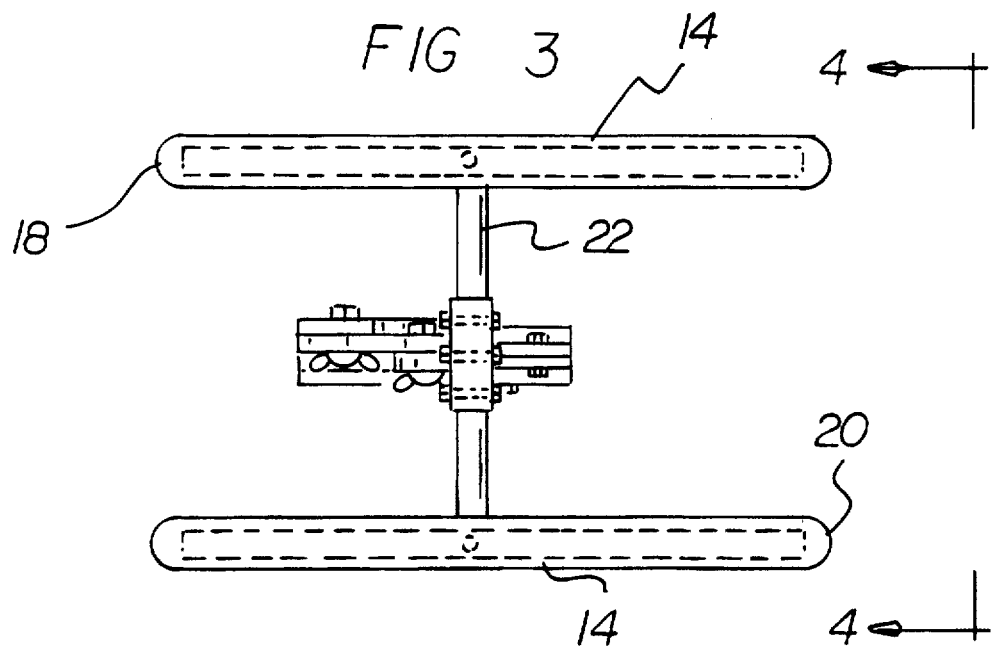
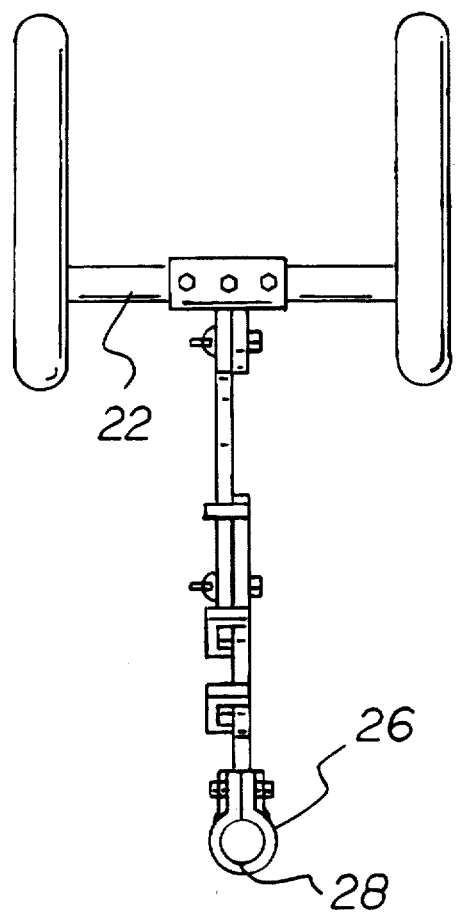

BICYCLE CHEST REST SYSTEM

BACKGROUND OF THE INVENTION

1. Field of the Invention

The present invention relates to a bicycle chest rest system and more particularly pertains to abating the weight from the arms, legs and feet of a bicycle rider.

2. Description of the Prior Art

The use of bicycle accessories of various designs and configurations is known in the prior art. More specifically, bicycle accessories of various designs and configurations heretofore devised and utilized for the purpose of relieving the physical stress on athletes by various methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,383,677 to Thomas et al. discloses a Bicycle Body Support Apparatus. U.S. Pat. No. 601,530 to D.T. Singleton discloses a Bicycle Shoulder Brace. U.S. Pat. No. Des. 340,555 to Ott discloses a Chest Rest for Dogs. U.S. Pat. No. 3,071,100 to C.L. Nicholson et al. discloses a Ski Rope Holder. U.S. Pat. No. 5,326,127 to Merecat et al. discloses a Safety Binding Heelpiece for Skis. Lastly, U.S. Pat. No. 5,195,394 to Latta discloses a Bicycle Handlebar Extension.

In this respect, the bicycle chest rest system according to the present invention substantially departs from the conventional concepts and designs of the prior art, and in doing so provides an apparatus primarily developed for the purpose of abating the weight from the arms, legs and feet of a bicycle rider.

Therefore, it can be appreciated that there exists a continuing need for a new and improved bicycle chest rest system which can be used for abating the weight from the arms, legs and feet of a bicycle rider. In this regard, the present invention substantially fulfills this need.

SUMMARY OF THE INVENTION

In view of the foregoing disadvantages inherent in the known types of bicycle accessories of various designs and configurations now present in the prior art, the present invention provides an improved bicycle chest rest system. As such, the general purpose of the present invention, which will be described subsequently in greater detail, is to provide a new and improved bicycle chest rest system and method which has all the advantages of the prior art and none of the disadvantages.

To attain this, the present invention essentially comprises a new and improved bicycle chest rest system for abating the weight from the arms, legs and feet of a bicycle rider comprising, in combination a pair of tubes which are positionable in an essentially parallel relationship at a generally common height above a bicycle 16. Each tube has a front and rear end that is positionable in the direction of bicycle movement. The front ends are at an elevation above the rear ends. The tubes are curved about a common radius of curvature with an axis of rotation thereabove. A central cross bar is located therebetween. Also provided is an attachment member beneath the tubes including a tubular lower region which is selectively positionable with respect to a central upper rail of the bicycle and with upwardly extending face plates with apertures for securement purposes. The plates include a central region with spaced plates to define a receptor section and with primary nuts and bolts for selective coupling purposes. An adjustable connector is provided having an upper section and a lower section each in an arcuate configuration with each section having an arcuate slot. The lower end of the lower section has apertures which are operatively couplable with respect to the apertures in the receptor section. The upper end of the upper section has an aperture for coupling with respect to the cross bar and with a secondary nut and bolt for coupling therebetween. Lastly provided are coupling components between the upper and lower sections including straps on the lower component for receiving and supporting the upper section and a tertiary section nut and bolt for the adjustable coupling therebetween.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bicycle chest rest system which has all of the advantages of the prior art bicycle accessories of various designs and configurations and none of the disadvantages.

It is another object of the present invention to provide a new and improved bicycle chest rest system which may be easily and efficiently manufactured and marketed.

It is further object of the present invention to provide a new and improved bicycle chest rest system which is of durable and reliable constructions.

An even further object of the present invention is to provide a new and improved bicycle chest rest system which is susceptible of a low cost of manufacture with regard to both materials and labor, and which accordingly is then susceptible of low prices of sale to the consuming public, thereby making such bicycle chest rest system economically available to the buying public.

Even still another object of the present invention is to provide a bicycle chest rest system for abating the weight from the arms, legs and feet of a bicycle rider.

Lastly, it is an object of the present invention to provide a new and improved bicycle chest rest system comprising a pair of tubes. Each tube has a front and a rear end positionable in the direction of bicycle movement with the front ends at an elevation above the rear ends. The tubes are curved about a common radius of curvature with an axis of rotation thereabove, and with a central cross bar therebetween.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top elevational view of the system shown in FIG. 2 taken along line 3—3 of FIG. 2.

FIG. 4 is a rear elevational view of the system of the prior Figures taken along line 4—4 of FIG. 3.

The same reference numerals refer to the same parts through the various Figures.

DESCRIPTION OF THE PREFERRED EMBODIMENT

Figure 1:
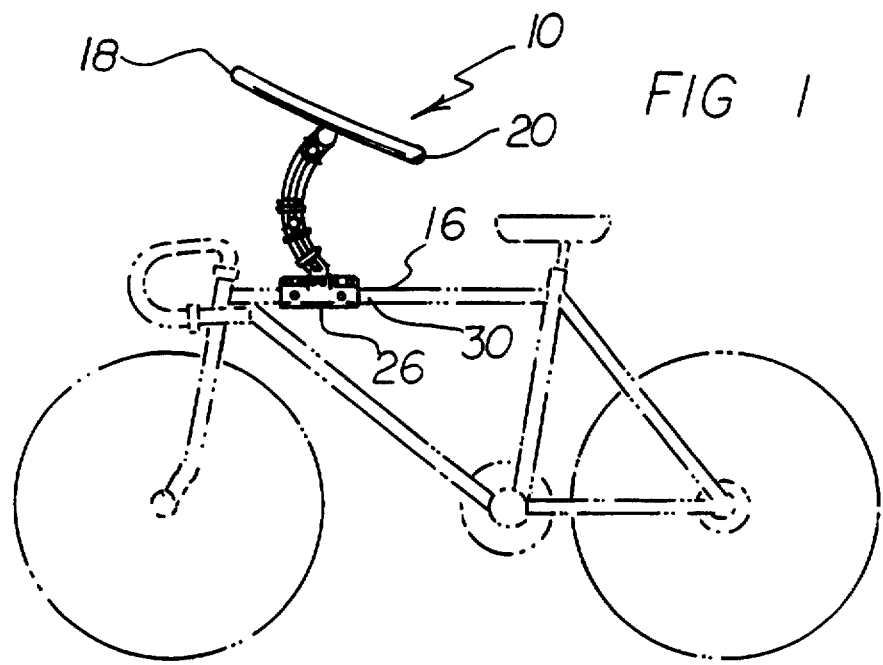
FIG. 1 is a side elevational view of the preferred embodiment of the bicycle chest rest system constructed in accordance with the principles of the present invention.
Figure 2:
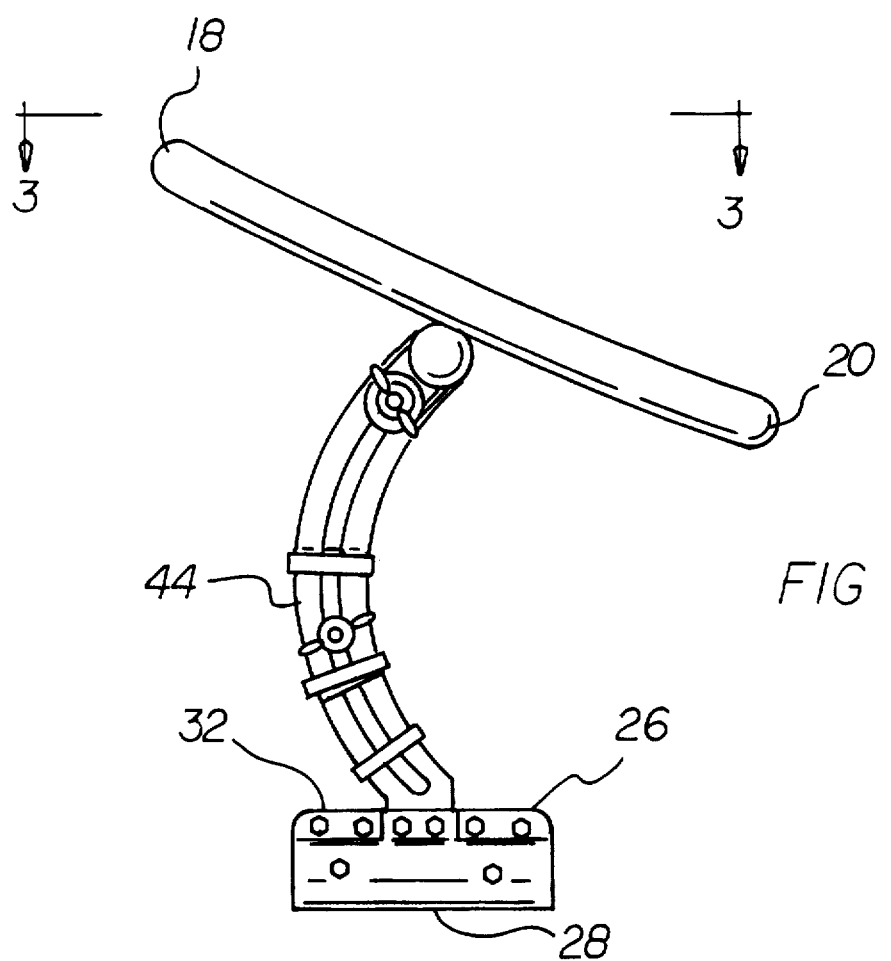
FIG. 2 is an enlarged side elevational view of the system shown in FIG. 1.
Figure 5:
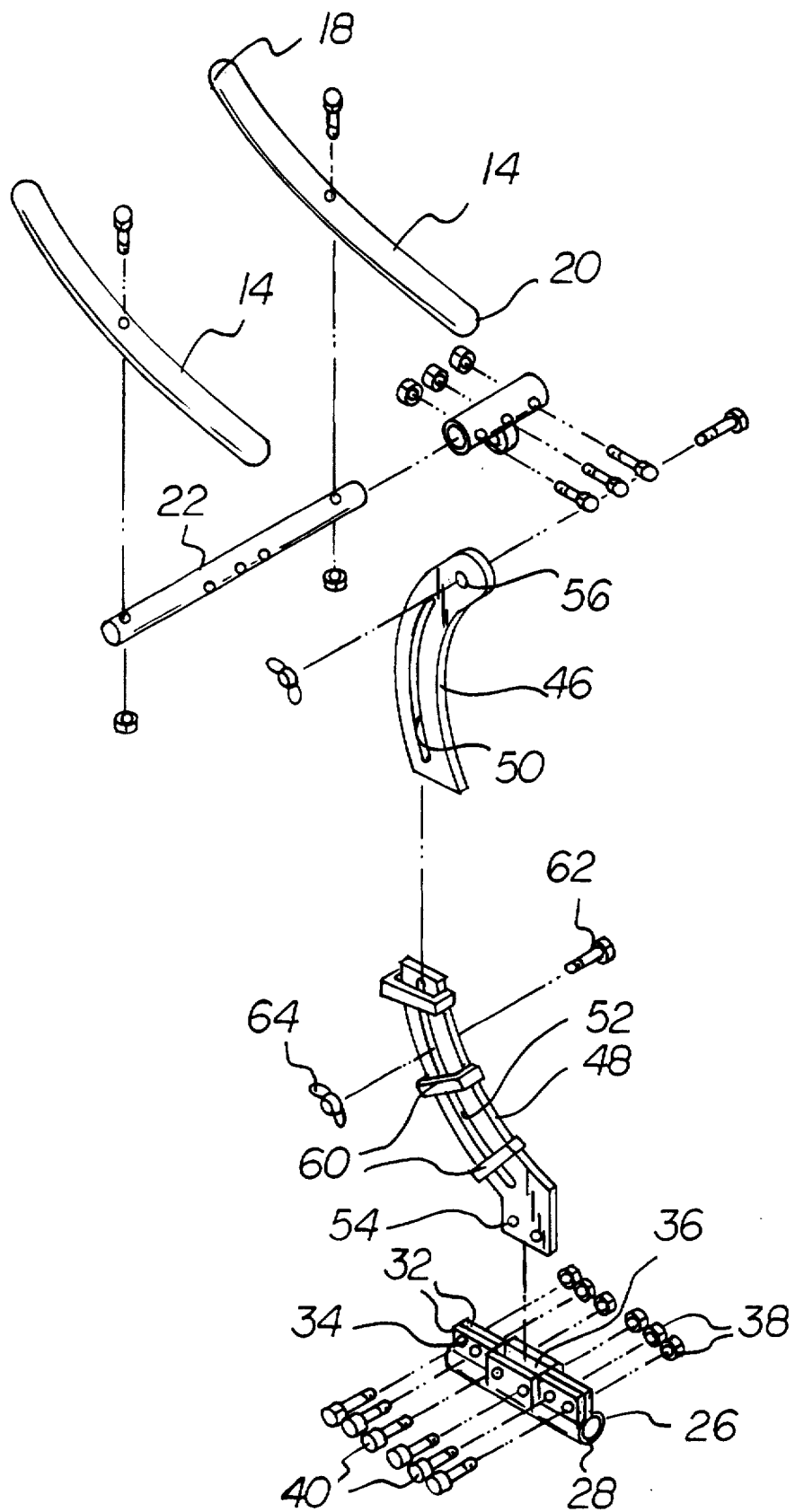
FIG. 5 is an exploded perspective view of the system of the prior Figures.

With reference now to the drawings, and in particular to FIG. 1 thereof, the preferred embodiment of the new and improved bicycle chest rest system embodying the principles and concepts of the present invention and generally designated by the reference numeral 10 will be described.

The present invention, the bicycle chest rest system 10 is comprised of a plurality of components. Such components are individually configured and correlated with respect to each other so as to attain the desired objective.

More specifically, the present invention is a new and improved bicycle chest rest system 10 for abating the weight from the arms, legs and feet of a bicycle rider. The system 10 includes a pair of tubes 14 that are positionable in an essentially parallel relationship at a generally common height above a bicycle 16. Each tube has a front 18 and a rear end 20 positionable in the direction of bicycle movement with the front ends at an elevation above the rear ends. The tubes are curved about a common radius of curvature with an axis of rotation thereabove, and with a central cross bar 22 therebetween at a central extent thereof. Ideally, each of the tubes is lined with a cushioning material such as foam.

Also provided is an attachment member 26 beneath the tubes including a tubular lower region 28 selectively positionable with respect to a central upper rail 30 of the bicycle. The tubular lower region has a slit formed along a top edge thereof which define free edges. Such free edges are each equipped with three slightly spaced upwardly extending face plates 32 with apertures 34 for securement purposes. The plates include a central region with spaced plates to define a receptor section 36 with primary nuts and bolts 38 and 40 for selective coupling purposes. It should be noted that the central region is flanked by two additional pairs of plates for securably coupling the attachment member to the bicycle.

The system also includes an adjustable connector 44 having an upper section 46 and a lower section 48 each in an arcuate configuration with each section having an arcuate slot 50, 52. The lower end of the lower section has a lower rectangular tap equipped with apertures 54 that are fixedly couplable with respect to the apertures in the receptor section. The upper end of the upper section has an aperture 56 for pivotally coupling with respect to the cross bar via a secondary nut and bolt.

Lastly provided are coupling components between the upper and lower sections including sleeve-defining straps 60 on the lower component for receiving and supporting the upper section. A tertiary section nut 62 and bolt 64 are to be inserted through the arcuate slots of the upper and lower sections of the adjustable connector for the adjustable coupling of the sections thereof.

As described hereinabove, the system of the present invention comprises a product to provide a means for bicyclists to rest their arms, leg, and seat when fatigued during a long ride. The present system comprises a pair of curved, padded plates or rests supported by an arched support bar that secures to the bicycle's cross tube via a clamp. The rests are parallel to the cross tube. The height and angle of the rests are adjustable. The rests are curved to conform to the shape of the chest. The chest rests are approximately 9 inches long and are spaced approximately 7 inches apart.

The appealing features of the present system are its ability to provide comfort to bicycle riders, as well as its convenience, ease in use, and ease of installation. The system offers a bicycle rider the option to rest his or her chest, taking the weight off the arms, legs and seat during long rides. As such, the system enables the rider to take rests without having to stop and get off the bicycle. The system is easily installed onto any style of bicycle and adjusts in height and angle for individual comfort.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle chest rest system for abating the weight from the arms, legs and feet of a bicycle rider comprising:

a pair of tubes positionable in an essentially parallel relationship at a generally common height above a bicycle, each tube having a front and a rear end positionable in the direction of bicycle movement with the front ends at an elevation above the rear ends, the tubes being curved about a common radius of curvature, and with a central cross bar therebetween;

an attachment member beneath the tubes including a tubular lower region selectively positionable with respect to a central upper rail of the bicycle and with upwardly extending face plates with apertures for securement purposes, the apertures including a central region with spaced plates to define a receptor section and with primary nuts and bolts and for selective coupling purposes;

an adjustable connector having an upper section and a lower section each in an arcuate configuration with each section having an arcuate slot, the lower end of the lower section having apertures operatively couplable with respect to the apertures in the receptor section, the upper end of the upper section having an aperture for coupling with respect to the cross bar and with a secondary nut and bolt for coupling therebetween; and coupling components between the upper and lower sections including straps on the lower component for receiving and supporting the upper section and a tertiary section nut and bolt for the adjustable coupling therebetween.

2. A bicycle chest rest system comprising:

a mounting assembly for coupling with a cross bar of a bicycle;

a pair of substantially parallel members pivotally coupled with respect to the mounting assembly for supporting a chest of a user;

wherein the mounting assembly includes an adjustable connector having an upper section connected to the pair of substantially parallel members and a lower section mountable on a central upper rail of a bicycle, each of the upper and lower sections having an arcuate configuration and each of the upper and lower sections having an arcuate slot; and coupling components coupling the upper and lower sections together, the coupling components including strap components formed on the lower section for receiving and supporting the upper section for sliding movement along an arcuate path with respect to the lower section for adjusting the position of the pair of substantially parallel members with respect to the central upper rail, and a fastener structure adjustable coupling the upper and lower sections for selectively locking the position of the upper section with respect to the lower section.

3. The system as set forth in claim 2 wherein each tube has a front and a rear end positionable in the direction of bicycle movement with the front ends at an elevation above the rear ends.

4. The system as set forth in claim 2 wherein the tubes are curved about a common radius of curvature.

5. The system as set forth in claim 2 additionally comprising a central cross bar connecting the pair of tubes.

6. The system as set forth in claim 5 wherein the substantially parallel members are arcuate in shape.

7. A bicycle chest rest system comprising:

a pair of chest support members positionable in an essentially parallel relationship at a generally common height above a bicycle, each chest support member having a front end and a rear end positionable in the direction of bicycle movement, the front ends being positionable at an elevation above the rear ends, the chest support members having an axis of rotation located below the chest support members;

an attachment member located beneath the chest support members and including a lower region selectively positionable with respect to a central upper rail of the bicycle, the attachment member having upwardly extending face plates;

an adjustable connector having an upper section and a lower section, each of the upper and lower sections having an arcuate configuration, each of the upper and lower sections having an arcuate slot; and coupling components coupling the upper and lower sections together, the coupling components including strap components formed on the lower section for receiving and supporting the upper section for sliding movement along an arcuate path with respect to the lower section for adjusting the position of the pair of chest support members with respect to a central upper rail of a bicycle received by the attachment member, and a fastener structure adjustably coupling the upper and lower sections for selectively locking the position of the upper section with respect to the lower section.

8. The bicycle chest rest system of claim 7 additionally comprising a central cross bar extending between the pair of chest support members.

9. The bicycle chest rest system of claim 7 wherein the face plates of the attachment member include a central region wherein the plates are spaced to define a receptor section for receiving a lower end of the lower section.

10. The bicycle chest rest system of claim 8 wherein the upper end of the upper section has an aperture for coupling to the central cross bar.

* * * * *